March 5, 1968     R. E. RICHARDSON     3,372,015
METHOD OF AND APPARATUS FOR EQUALIZING THE COOLING
OF A GLASS SHEET SUPPORTED ON A BENDING MOLD
Filed May 12, 1964     2 Sheets-Sheet 1

Inventor
Ronald E. Richardson
By Cushman, Darby & Cushman
Attorneys

United States Patent Office 3,372,015
Patented Mar. 5, 1968

3,372,015
METHOD OF AND APPARATUS FOR EQUALIZING THE COOLING OF A GLASS SHEET SUPPORTED ON A BENDING MOLD
Ronald E. Richardson, Oshawa, Ontario, Canada, assignor to Pittsburgh Plate Glass Company, Pittsburgh, Pa., a corporation of Pennsylvania
Filed May 12, 1964, Ser. No. 366,744
Claims priority, application Canada, Nov. 15, 1963, 889,119
9 Claims. (Cl. 65—103)

ABSTRACT OF THE DISCLOSURE

Apparatus and method of bending, annealing and cooling glass wherein the glass sheet is supported at its marginal edges on an outline type bending mould and conveyed through bending, cooling and annealing zones of a conventional bending lehr. A heat sink in the form of a confined, heated body of air is maintained in contact with a portion of the sheet inboard of the trailing edge of the latter thereby retarding the cooling of said sheet portion during the cooling and annealing stages and hence promoting toughening of the trailing edge of the sheet. The body of air is confined by means of an air barrier in the form of a relatively thin metal sheet underlying at least the sheet portion mentioned above and spaced therefrom to form a confined chamber. The metal sheet is connected to the central trailing edge portion of the bending mould in a manner to prevent substantial escape of the heated air from the chamber.

The present invention relates to improved molds for use in the cooling and annealing of glass sheets and a method of improving the stress pattern in bent and annealed glass sheets.

Present methods for the production of bent glass sheets, such as those used in the automobile industry, generally involve placing the sheets on molds having shaping surfaces of skeleton outline and passing the assemblies of the sheets and the molds through a tunnel-like bending lehr within which the glass is heated to bending temperature and sags under the influence of gravity, thereby acquiring a curvature conforming to that of the shaping surface.

For the formation of relatively complicated bends, the molds are divided into sections each of which constitutes a portion of the shaping surface. These sections are movable relative to one another into a spread or open mold position for receiving a glass sheet and tend to move into a closed mold position in which they combine to provide a substantially continuous skeleton shaping surface conforming in elevation and outline to the curvature desired for the bent sheets. When producing simple bends subdivision of the mold into sections is not necessary and the shaping surface is of a fixed construction.

The glass sheets used in the production of automobile windshields and rear windows are of an elongated nature. According to present practice the sheets are mounted on molds of the kind mentioned above and are conveyed through a tunnel-like bending lehr with their longest dimension extending transversely of the direction of travel through the lehr.

The lehr includes a number of zones at different temperature, namely a preheating zone within which the temperature of the glass is raised from room temperature to a temperature approaching the bending temperature, i.e., the softening point of the glass, a bending zone wherein the temperature is further raised, so that the whole of the sheet is exposed to bending temperature, with application of especially intense heat to any regions of the sheet which are to be more severely bent than other regions, an initial cooling zone wherein the temperature of the sheet is reduced from the bending temperature to the upper limit of the annealing range, an annealing zone wherein the sheet is gradually cooled through the annealing range for the purpose of relieving stresses which have been set up during the bending operation and a final cooling zone wherein the glass finally reaches or approaches room temperatures.

Commonly the initial cooling zone is not distinguished as a separate entity from the annealing zone but is merely regarded as the initial portion of the annealing zone. The temperature of the bending zone depends to some extent on the nature of the glass but is normally in the range of from 950 to 1200° F. The temperature of the annealing zone is normally from about 1050 to 950° F., decreasing in the direction of travel of the glass sheet through the lehr.

In the bending zone the temperature of the glass sheet is raised above the softening point of the glass so that it sags downwardly into conformity with the shaping surface. During the cooling following this operation random stresses are likely to be set up within the glass, particularly at regions of the sheet where a complex curvature is imparted to the sheet. A main purpose of subsequently passing the sheet through the annealing zone is to eliminate or reduce such random stresses in the sheet.

In addition, it is desirable to promote the formation of certain specific stresses for the purpose of improving the edge strength of the sheet, during annealing. If it can be arranged that upon passage of the glass sheet through the initial cooling zone the edges of the sheet are cooled more rapidly than the center of the sheet, so as to bring the marginal edge of the sheet below the glass annealing range sooner than the center portion of the sheet, the marginal edge of the sheet will then be subjected to compression during subsequent cooling of the center of the sheet, thereby producing a sheet with a toughened marginal edge.

In the conventional method of bending and annealing a glass sheet the desired result of obtaining a sheet with a toughened marginal edge is usually satisfactorily achieved insofar as the edge of the sheet is concerned which constitutes the leading edge of the sheet during progress thereof through the bending and annealing lehr. However, such satisfactory results are not achieved in respect of the trailing edge of the sheet and it is frequently found that this edge has a considerably lower strength than the leading edge of the sheet.

A consideration of the heat transfer conditions prevailing during the passage of the glass sheet through the annealing zone suggests a reason for this difference between the strength of the leading and trailing edges of the sheet. As the sheet moves through the annealing zone cooling of the leading edge of the sheet takes place by way of all of the three surfaces bounding this edge of the sheet, i.e. the upper and lower surfaces of the sheet and the edge surface of the sheet. The edge surface of the sheet is moving directly against the relatively cool atmosphere in the annealing zone and there is also continuous disturbance of this atmosphere so that there is efficient heat exchange at this surface.

Similarly efficient heat exchange takes place at the upper and lower surfaces bounding the leading marginal edge of the sheet.

No portion of the sheet other than the leading marginal edge can, theoretically, at least, ever be exposed to such favourable cooling conditions since the other portions of the sheet do not have the advantage of having heat withdrawn from them through a surface at which the heat transfer characteristics are as good as those prevailing at the edge surface of the leading marginal edge. The remaining portions of the sheet move into regions of the annealing zone which have just previously been traversed by the leading marginal edge of the sheet and have thereby been temporarily raised to a temperature greater than that prevailing in these regions before the arrival of the sheet.

So far as the center of the sheet is concerned this is all to the good since it is desirable that the rate of cooling of the center of the sheet should be lower than that exerted on the marginal edges of the sheet in order that these edges may be put into cmopression during the subsequent overall cooling of the sheet. With respect to the trailing edge of the sheet, however, the situation is considerably less satisfactory.

Ideally the trailing edge of the sheet should be cooled at the same rate as the leading edge of the sheet so as to obtain an end product which has a marginal edge of substantially uniform toughness. It may indeed be thought surprising that in the method of the prior art any success at all has been achieved in promoting toughness in the edge of the sheet which was the trailing edge during the passage of the sheet through the annealing zone.

The air surrounding the trailing marginal edge has suffered localized heating not only due to passage therethrough of the leading marginal edge of the sheet but also due to the passage of all the glass supporting mold and parts of the sheet other than the trailing marginal edge. It might, therefore, be expected that the trailing marginal edge would be actually cooled less rapidly than the center portion of the sheet, so that instead of producing a finished sheet in which the trailing marginal edge is in compression the trailing marginal edge would be in tension. That this is not normally the case may perhaps be due to the air circulation characteristics adjacent the marginal edge of the glass sheet. Furthermore the supporting surface thermally ballasts the glass in direct contact with it. The extreme edge projects by the supporting surface and therefore, cools slightly faster than the ribbon of glass immediately in contact with the supporting surface. This effect however is normally quite minor.

The trailing marginal edge does have some advantage over the center part of the sheet in that withdrawal of the heat from the trailing marginal edge takes place not only through the upper and lower surfaces of this edge but also through the edge surface. However, the heat transfer conditions at this edge surface are clearly not as good as those prevailing at the corresponding edge surface of the leading marginal edge.

Whereas the edge surface of the leading marginal edge is continually disturbing the atmosphere as it advances through the annealing zone, the trailing marginal edge is moving away from the atmosphere in contact with it so that the formation of a dead space immediately behind the edge surface of the trailing marginal edge is to be expected and this is not conducive to good heat transfer. Nevertheless some cooling of the marginal edge will take place through the edge surface and it may be presumed that this cooling, taken in conjunction with a cooling retardation effect slightly inward of the marginal edge due to conduction of the heat toward the glass sheet inward of its edge by the adjacent mold supporting surface, is sufficient to effect a faster cooling of the marginal edge than of the supported portion of the sheet. However, the heat transfer conditions prevailing at the trailing marginal edge are clearly less efficient than those of the leading marginal edge and this difference is manifested in the character of the bent sheets produced by the methods of the prior art which, as mentioned above, are frequently less than satisfactory in that the trailing edge of the sheet is found to have less strength than the leading edge of the sheet.

It is an object of the present invention to provide an improved apparatus for supporting a glass sheet during a cooling and annealing operation carried out subsequent to the heating of the sheet to a temperature above the upper limit of the annealing range, which improved apparatus permits the production of an annealing sheet having both edges satisfactorily toughened. Normally the aforementioned heating will be a heating operation which is effective to cause bending of the sheet into conformity with a shaping surface.

The invention will be described by way of illustration and without limitation with reference to the accompanying drawings wherein.

Figure 1:
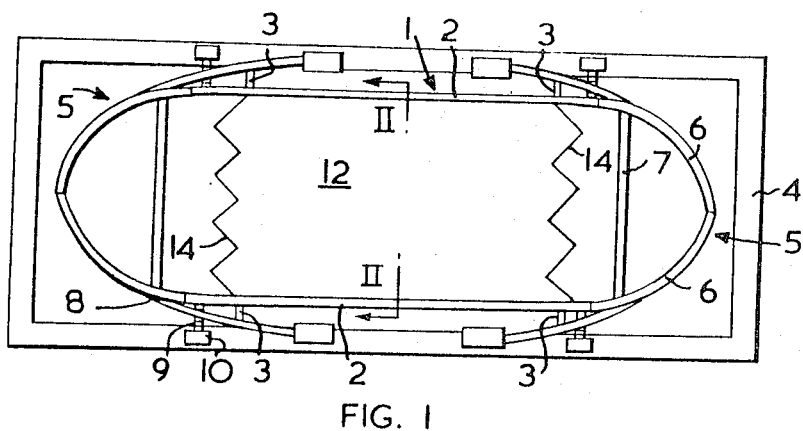
FIGURE 1 is a plan view of one embodiment of the present invention as applied to a glass bending mold.

The mold shown in FIGURE 1 is a type commonly used for bending automobile glass. It comprises a center section 1 including two laterally spaced elongated glass supporting rails 2 having shaping surfaces formed on their upper edges. The glass supporting rails 2 are carried by brackets 3 which are secured to a main frame 4. In addition to the center section 1 there are provided end sections 5 each of which comprises two longitudinally curved glass engaging rails 6 meeting at their outer end to form the end of the mold and interconnected at their inner ends by a reinforcing rod 7. To each glass engaging rail 6 is secured a weighted arm 8 which is mounted for pivotal movement on a pivot pin 9 carried by a bracket 10 secured to the frame 4.

Figure 2:
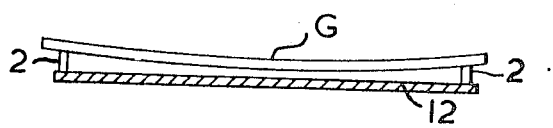
FIGURE 2 is a partial cross-section along the line II—II of FIGURE 1.

The bending mold construction described above with reference to FIGURE 1 is of generally conventional type. However, the mold of FIGURE 1 differs from the molds of the prior art in that there is provided a sheet 12 attached to at least one of the glass supporting rails 2 throughout substantially the length of said sheet beneath the shaping surfaces and traverses the glass supporting rails 2. The sheet 12 is made of mild steel $\frac{1}{16}$ of an inch thick and is welded along each of its two opposing longitudinal edges to the glass supporting rails 2. Therefore, as seen in FIGURE 2, the sheet 12 serves to form a chamber in combination with the glass supporting rails 2 and a glass sheet G carried by these rails. This chamber is open only at the ends thereof adjacent the end sections 5. In these regions the sheet 12 is slashed in zig-zag fashion to present non-rectilinear edges 14.

The mold together with the attached sheet 12 and glass G is conveyed in the usual manner with the longest dimension transverse to the direction of travel.

The purpose of providing the sheet 12 is to create beneath the central portion of the sheet G an enclosed body of hot air which assists the center of the sheet to remain hot during the cooling and annealing operation. By providing such a body of hot air it is found that the center of the sheet is kept hot longer than the edges of the sheet. This has the result that the edges of the sheet are both satisfactorily toughened. The fact that the leading edge of the sheet may still be tougher than the trailing edge of the sheet is not important so long as the trailing edge of the sheet is brought to an adequate degree of toughness and it is found that by using a mold of the type shown in FIGURE 1 this can be achieved. The zig-zag slashing of the ends of the sheets 12 adjacent the end sections 5 is for the purpose of preventing too abrupt a transition of heat transfer characteristics beneath the adjacent surface of the glass sheet.

The sheet 12 of the mold of FIGURE 1 extends only beneath the center section 1. This is because as a practical matter little difficulty is usually encountered as a result of differential toughening of opposite edges at the ends of the sheet when they are of the pointed type to which the end sections 5 of the mold of FIGURE 1 correspond.

Figure 5:
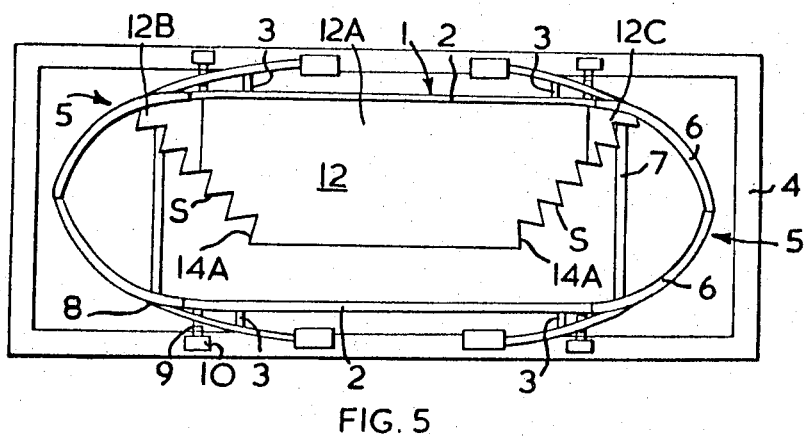

It would however be feasible to provide additional sheets similar to the sheet 12 extending between the glass engaging rails 6 of the end sections 5 if desired. (One such embodiment is shown in FIG. 5.)

The enclosure formed by the sheet 12, glass G and glass supporting rails 2 is effectively a heat sink and accordingly the volume of trapped air is important. This volume may be varied by positioning the sheet 12 at various distances from the glass G. Obviously as the sheet is brought nearer to the glass the volume of trapped air is reduced and may become reduced to an extent where little of the desired action will take place. On the other hand, too great a volume may retain too much heat and be detrimental. In an actual device in use, a spacing of 2½ inches between the sheet 12 and glass G has found to give satisfactory results.

It will be appreciated that there is some loss of air from the air chamber formed by the glass sheet G, the glass supporting center section rails 2 and the sheet 12 since the ends of this chamber are open adjacent the end sections 5. It is found in practice that this loss of air is not sufficiently great that the desired object of keeping the center portion of the sheet hotter than the edges of the sheet is prevented from being achieved. In a case where any difficulty was encountered it would be possible to reduce the tendency for escape of air from beneath the glass sheet G by turning the non-rectilinear edges 14 of the sheet 12 upwardly. Such an expedient must be adopted with some caution since undesirable thermal effects may result from bringing the edges 14 too near to the glass sheet G. It may indeed be noted that ideally the thickness of the sheet 12 should be so chosen that the sheet acts as neither a heat absorber nor a heat radiator. This is equivalent to saying that the heat absorbing and heat radiating characteristics of the sheet cancel each other out. The sheet is present to act as a physical air barrier and the thickness of the sheet is selected so that this barrier will exert as little as possible thermal influence on the surrounding atmosphere throughout the thermal cycle to which the glass is exposed. The selection is, of course, related to the thermal cycle to which the glass is to be subjected. In most thermal cycles used for the bending of windshield laminates, mild steel $\frac{1}{16}$ of an inch thick is generally found to be relatively neutral. Steel sheets $\frac{1}{32}$ of an inch thick and thinner are relatively radiant and steel sheets $\frac{1}{8}$ of an inch thick and thicker are found to be relatively absorptive. The barrier sheet immobilizes the air to encourage its elevation in temperature during the heating portion of the cycle as well as to discourage its cooling during the cooling portion of the cycle.

Although it has been indicated that the sheet is welded to the rails, other means of securement may obviously be utilized providing such members are in sealing engagement. The sheet 12 and the trailing glass supporting rail 2 need not form an exact seal provided the amount of leakage between the glass supporting rail 2 and the sheet 12 is sufficiently small in the annealing zone to prevent substantial loss of the hot air that retards the cooling of the area of the glass sheet above the volume of hot air encompassed by the open box formed between the glass supporting rail 2, the glass sheet G and the sheet 12.

Figure 3:
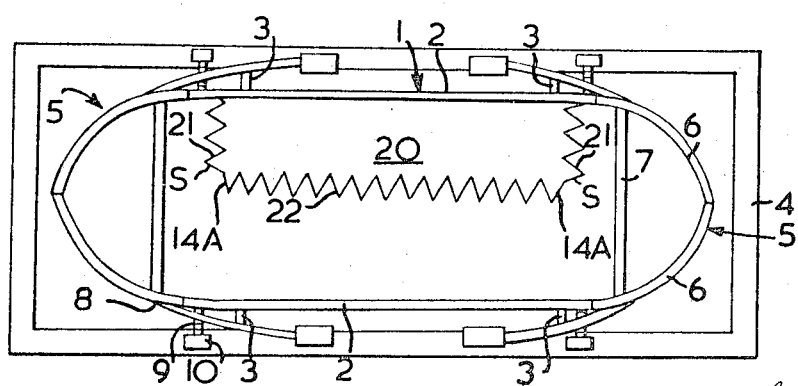
FIGURE 3 is a schematic illustration of a further embodiment.

FIGURE 3 illustrates a modification of the center section of the mold of FIGURE 1 wherein the sheet 12 has been replaced by a sheet 20 which extends only half way across the space between the glass supporting rails 2. The sheet 20 has not only been slashed at its ends to provide non-linear edges 21 similar to the edges 14 of the mold of FIGURE 1 but it has also been slashed in a similiar manner along the side thereof extending parallel with the side which is welded to one of the glass supporting rails 2, thereby providing a non-rectilinear edge 22. The purpose of having the non-rectilinear edges 22 and 22 is again to avoid any abrupt transitions of the characteristics beneath the glass sheet. Conceivably similar effects can be realized by appropriate deformation to the sheet adjacent the marginal edges. Such deformation may involve ribbing, grooving and/or perforating.

A mold of the type schematically illustrated in FIGURE 3 is used with the trailing edge of the sheet supported by the glass supporting rail 2 to which the plate 20 is secured as by welding or the like. Therefore, a body of hot air enclosed between the glass sheet, the sheet 20 and the glass supporting rail 2 to which the sheet 20 is fixed serves to keep hot that part of the central portion of the sheet lying immediately adjacent to the trailing edge of the sheet. Thus, toughening of the trailing edge of the sheet is promoted. In this manner, it is possible to produce a sheet the leading edge of which has a toughness more or less the same as that which would be imparted to it in the absence of the sheet 20 from the mold while simultaneously increasing the toughness of the trailing edge. This tends to equalize the toughness of the leading and trailing edges.

Since the sheet 20 does not extend all the way across the mold there is much more tendency for escape of hot air from beneath the glass sheet than is the case when using the mold of FIGURE 1. In the mold of FIGURE 3, the hot air cannot only escape by way of the edges 21 but also by way of the edge 22. The nearer the edge 22 is brought to the glass supporting rail 2 to which the sheet 20 is affixed the less is the compression stress improvement at the trailing edge of the sheet adjacent that glass supporting rail. In general it can be taken that the sheet 20 should extend at least half way across the mold in order to obtain satisfactory results. Moreover, it should be emphasized that the sheet 20 must sealingly engage the glass supporting rail 2 along a substantial portion of the length of the sheet. Any substantial escape of air between the sheet 20 and the glass supporting rail 2 to which it is affixed cannot be tolerated.

Figure 4:
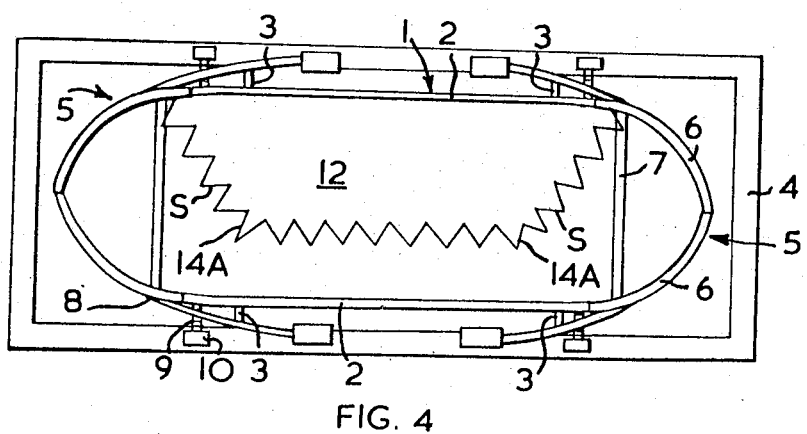
FIGURES 4 and 5 are plan views of other embodiments.

FIGURE 4 illustrates a further modified form wherein the marginal edge 14A of the sheet is arcuately projecting from only one glass supporting rail 2 toward the other rail. The curvature may be suitably selected to effect the desired results. Also the peripheral edge is appropriately shaped, i.e., serrated as at end portions S, to effect the desired results. In this modified form it will also be noted that opposed end portions of the sheet extend into the opposed end section 5 of the mold. In this embodiment, the mold is oriented in passing through the lehr such that the sheet 12 is secured to the trailing glass supporting rail. The sheet 12 is disposed with its trailing side edge in engagement with the trailing glass supporting rail so as to form a box-like structure with the undersurface of the glass sheet and the trailing glass supporting rail of the center section.

In FIGURE 5, the sheet 12 is shown as consisting of a central portion 12A and opposed end portions 12B and 12C. The portions 12B and 12C are secured to the pivotally mounted portion of the mold and the junction between such end plates and the central portion 12A is substantially along the pivoted axis or cut-point of the mold. These end portions provide means of trapping selected volumes of air under the end portions of the sheet, if such is found to be necessary. The terminal edge of the portions 12A and B and C facing the opposed rail may be serrated or otherwise deformed to provide selected distribution of air escaping from between the pane of glass supported by the mold, and the sheet 12.

The embodiment of FIGURE 5 differs from that of the other figures in that the opposed end portions 12B and 12C are pivoted with respect to the central portion 12A of the sheet 12. In the position depicted to the left of FIGURE 5, end portion 12B of sheet 12 assumes a horizontal position in alignment with the center portion 12A. In the closed position end portion 12C is shown assuming an angular position with respect to central portion 12A.

The end portions 12B and 12C are rigidly attached to the bottom of the glass engaging rails 6 disposed at the extremities of one longitudinal side edge of the mold end whose upper surfaces form continuations for one of the elongated glass supporting rails 2 of the center mold section. Thus, end portions 12B and 12C form longitudinal extensions for the sheet 12 extending inward from one longitudinal side edge of the mold in this embodiment.

I claim:
1. Apparatus for supporting a glass sheet during a cooling and annealing operation comprising two spaced elongated glass-supporting rails for supporting the sheet along opposite marginal edges thereof and an imperforate sheet member in close engagement with at least one of said glass-supporting rails along a major portion of the length thereof at a preselected level below the level at which said rails support the glass sheet, said sheet member extending laterally for a preselected distance in a direction away from said one of said glass-supporting rails toward the other of said glass-supporting rails to form a fluid-retaining enclosure of preselected volume between said sheet member, said one glass-supporting rail, and a glass sheet when it is supported on said two spaced elongated glass supporting rails, said sheet member being of a material and thickness such that it serves as a physical barrier to prevent escape of fluid from said fluid retaining enclosure without any significant thermal effect on the surrounding atmosphere during its exposure to the temperature cycle incidental to glass bending, cooling and annealing.

2. Apparatus according to claim 1 wherein said sheet member extends all the way between said spaced glass-supporting rails.

3. Apparatus according to claim 1 wherein at least a portion of the edge of said sheet member which is not in close engagement with said glass-supporting rails is non-rectilinear.

4. Apparatus according to claim 1 wherein said sheet member extends less than the entire distance between said spaced glass-supporting rails but more than half that distance.

5. Apparatus as defined in claim 1 wherein said glass-supporting rails define a center section of a glass mold, said mold including opposed end sections having glass engaging rails, which, together with said glass supporting rails define a support for the periphery of said glass sheet and wherein at least one end portion of said sheet member extends into said mold end sections.

6. The method of bending and annealing a glass sheet comprising: supporting said sheet on a skeleton type mold having an upwardly facing continuous outline shaping surface spaced peripherally inwardly of the marginal edges of said sheet, when said sheet conforms to the shape thereof, conveying said supported glass through a zone of heated fluid to effect heating of said glass to the softening point whereby it sags into conformity with said outline shaping surface with the marginal edges of said sheet extending beyond the outline shaping surface, partially confining a selected volume of said heated fluid from said zone to provide a heat sink of thermal capacity determined substantially by the magnitude of said selected volume, and maintaining said heated fluid in contact with a selected portion of the surface of said glass sheet supported on the shaping surface, said selected portion being disposed inwardly of the marginal edge of said glass sheet, and conveying said glass sheet, mold and partially confined heated fluid through successive regions of successively colder temperature extending through the annealing range of said glass; said heated fluid retarding the cooling rate of the selected portion of said glass sheet contacted by said fluid whereby the trailing edge cools through the annealing range before said selected portion.

7. Apparatus for supporting a glass sheet during bending, cooling and annealing thereof, comprising a sectionalized skeletonized mold having a centre portion including two spaced elongated glass supporting rails having upper surfaces for supporting the glass sheet along opposed marginal edges, and a pair of end sections pivotally secured thereto at opposed ends of said centre section, each of said end sections having a glass engaging rail which engages the under surface of the glass sheet, each glass engaging rail having an upper surface forming a continuation of the upper surface of one of the said elongated glass supporting rails when pivoted to molding position, and an imperforate main sheet member sealingly engaging at least one of said elongated glass supporting rails throughout a major portion of its length and disposed at a level vertically below the level at which said supporting rails contact the surface of the glass sheet, and additional sheet members sealingly engaging respectively the glass engaging rails of the end sections of the mold, said additional sheet members cooperating with the first mentioned main sheet member and supported sheet of glass to define a substantially continuous chamber capable of retaining a body of fluid therein, said main sheet member and said additional sheet members extending laterally from said one glass supporting rail and from said glass engaging rails respectively in sealing engagement therewith generally towards the other of said glass supporting rails, said main sheet member and said additional sheet members each of material and thickness such that they serve to provide a physical barrier to prevent a substantial loss of fluid from said substantially continuous chamber during annealing without any significant thermal effect on the surrounding atmosphere during exposure of said main and additional sheet members to the temperature cycle incidental to glass bending, cooling and annealing.

8. The method of bending and annealing glass sheets comprising supporting a glass sheet on an upwardly facing outline shaping surface, heating said glass to the softening point whereby said sheet sags into conformity with said shaping surface, partially confining a predetermined volume of heated fluid in contact with a surface portion of said glass sheet inwardly of the marginal edges thereof, said volume of heated fluid acting as a heat sink of pre-selected capacity, and subjecting said supported, heated glass and volume of heated fluid to successively colder temperatures extending through the annealing range of said glass thereby causing a transfer of heat energy from said volume of heated fluid to said surface portion of the glass sheet and thereby retarding the cooling rate of the latter.

9. In the method of cooling a glass sheet during annealing thereof wherein said glass sheet is supported on an upwardly facing support surface and moved through regions of successively lower temperatures extending through the annealing range of the glass, the improvement comprising: maintaining that portion of the moving glass sheet which is forwardly of the trailing edge thereof in thermal communication with a heat sink of predetermined thermal capacity by confining a body of heated fluid of volume sufficient to provide said predetermined thermal capacity in direct contact with said portion of the glass sheet and moving said confined body of heated fluid together with the sheet through said regions of successively lower temperatures whereby heat transfer away from said confined body of heated fluid retards the cooling rate of said portion of the glass sheet.

References Cited

UNITED STATES PATENTS 3,206,294 9/1965 Shaffer et al. _____ 65—103
3,278,287 10/1966 Leflet et al. _____ 65—103

DONALL H. SYLVESTER, *Primary Examiner.*

A. D. KELLOGG, *Assistant Examiner.*